Figure 1:
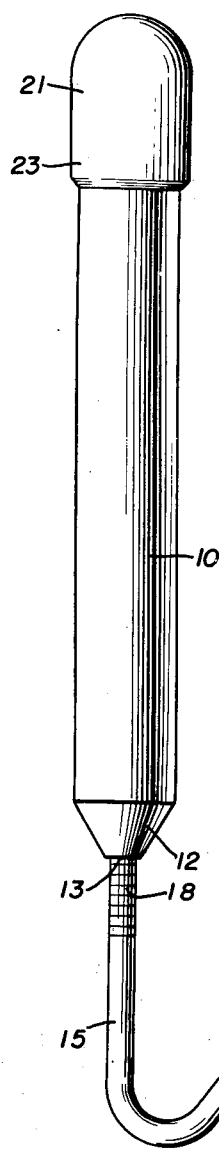

Feb. 19, 1952  D. K. McRAE  2,586,245
COMBINATION GAFF HOOK AND SCALE
Filed April 30, 1947

Inventor
Donald K. Mc Rae

By *Clarence A. O'Brien
and Harvey B. Jacobson*
Attorneys

Patented Feb. 19, 1952

2,586,245

UNITED STATES PATENT OFFICE 2,586,245

COMBINATION GAFF HOOK AND SCALE

Donald K. McRae, Wilmington, N. C.

Application April 30, 1947, Serial No. 744,857

4 Claims. (Cl. 265—66)

1

This invention relates to a combination gaff hook and scale and has for its primary object to facilitate the weighing of a fish catch or the like.

Another object is to enable the device to be used as a gaff hook or a scale according to the desires of the user.

The above and other objects may be attained by employing this invention which embodies among its features a tubular body, a rod slidable longitudinally through the body, a load sustaining hook at one end of the rod, a scale intermediate the ends of the rod for cooperation with one end of the body in indicating the weight of a load suspended on the hook, means within the body engaging the rod yieldingly to resist relative movement between the body and the rod under the influence of a load suspended on the hook and means at the end of the body remote from that which cooperates with the scale selectively to engage the end of the rod remote from the hook and hold the rod against movement under the influence of a load suspended on the hook.

Other features include a cap rotatably mounted on the end of the body remote from the hook selectively to engage the end of the rod remote from the hook, to hold the rod against movement relative to the body.

Figure 2:
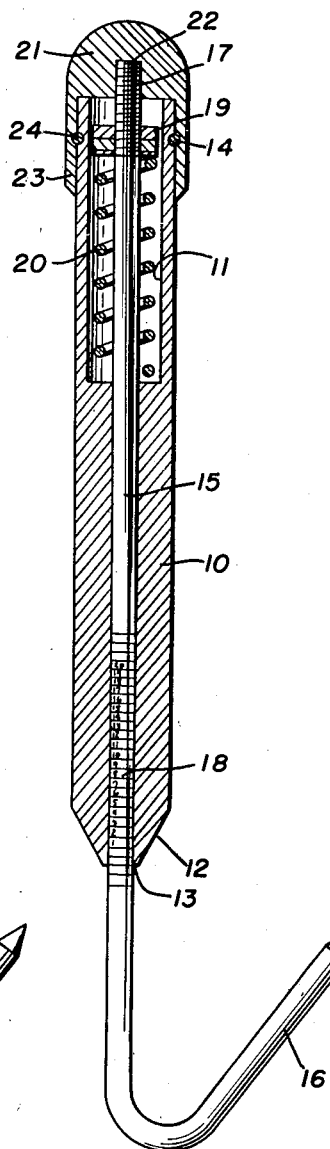
Figure 3:
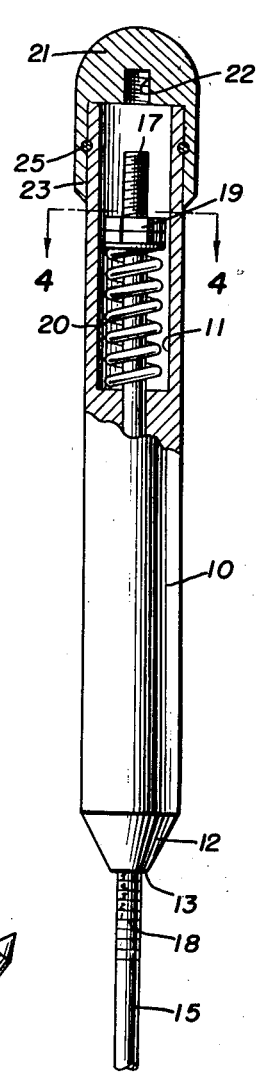
Figure 4:
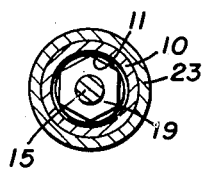
Figure 5:
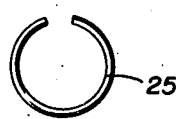

In the drawings:

Figure 1 is a side view of a combination gaff hook and scale embodying the features of this invention, Figure 2 is a longitudinal sectional view through the device illustrated in Figure 1, Figure 3 is a side view partially in section of the gaff hook and scale illustrating the parts in a different position from that illustrated in Figure 2, Figure 4 is a transverse sectional view taken substantially along the line 4—4 of Figure 3, and Figure 5 is a plan view of the retaining ring for holding the cap on the end of the tubular body.

Referring to the drawings in detail this improved gaff hook and scale comprises a tubular body 10 having an enlarged axial bore 11 entering one end. The end of the tubular body opposite that entered by the axial bore 11 is tapered as at 12 to form a relatively narrow edge 13 and improve the visibility of the latter. Formed in the periphery of the body 10 adjacent the end entered by the enlarged axial bore 11 is an annular groove 14 the purpose of which will be more fully hereinafter explained.

2

Mounted for longitudinal sliding movement through the body 10 is a rod 15 carrying at one end a load suspending hook 16. The end of the rod opposite that carrying the hook 16 is externally screw threaded as at 17 and formed on the surface of the rod near the point where it projects through the reduced end 12 of the body 10 is a suitable graduated scale 18 which is adapted to cooperate with the reduced edge 13 of the body 10 in indicating the weight of a load imposed upon the hook 16.

Threaded on the threaded end 17 of the rod 15 for longitudinal adjustment thereon is a suitable stop 19, and surrounding the rod between the innermost end of the enlarged axial bore 11 and the stop 19 is a compression coil spring 20 which is adapted yieldingly to resist movement of the rod 15 under the influence of a load imposed upon the hook 16.

Fitted over the end of the body 10 entered by the enlarged axial bore 11 is a cap 21 which is provided on its inner face with an internally screw threaded axially disposed socket 22 which as illustrated in Figure 2 is adapted to receive the screw threaded end 17 of the rod 15, in order to hold rod against longitudinal movement with relation to the body. The cap 20 is provided with an annular flange 23 which as illustrated in the drawings overlies the periphery of the body 10 adjacent the end entered by the bore 11, and formed on the interior of the flange is an annular groove 24 which when the cap is in place aligns with the groove 14 previously described and receives a split spring ring 25 which serves to hold the cap in place on the body.

In use when the device is to be used as gaff hook, the threaded end 17 of the rod 15 enters the threaded socket 22 as illustrated in Figure 2, and a load may be imposed on the hook 16 without causing relative movement between the body 10 and the rod 15. When so used the body 10 forms the handle for the gaff hook and the device may be manipulated in the conventional manner. When the fisherman desires to weigh his catch it is only necessary to suspend the catch on the hook 16 and release the threaded end 17 of the rod 15 from the threaded socket 22 so that the weight of the catch will be suspended on the spring 20, and upon reading the scale 18 against the edge 13 of the body 10 it will be evident that the weight of the catch may easily and quickly be determined. In order that the scale may be adjusted it is obvious that by turning the stop 19, the graduations 18 may be moved to proper relationship with the edge 13 of the body 10, and the scale thus may be initially set to correspond to a standard unit of weight. The spring 20 normally urges the rod 15 upwardly so as to bring the upper end of the rod against the lower end of the cap 21 adjacent the socket 22 so that simply by turning the cap it is possible to lock the rod against motion relative to the body 10.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. In the combination of a gaff hook and scale comprising a handle with a pair of ends, an article holding member slidable in said handle, and a means for urging the holding member towards one end of the handle; a closure means comprising a cap peripherally enclosing said one end of the handle, means in said cap receiving and retaining one end of the holding member when the device is to be used as a gaff hook, and means for retaining said cap on the handle.

2. In the combination of a gaff hook and scale comprising an elongated handle with a pair of ends, a hook member slidable in said handle screw threaded at the end opposite the hook, and a means for urging the hook member towards one end of the handle; a closure means comprising a cap receivable on said one end of the handle, means in said cap receiving the screw threaded end of the hook member when the device is to be used as a gaff hook, and means for retaining said cap on said handle.

3. The combination of claim 2 wherein said closure means includes an internally threaded socket.

4. The combination of claim 2 wherein said last-named means includes an annular groove in said handle adjacent said one end thereof, an annular groove in said cap in alignment with sad first-mentioned groove, and a split ring positioned in both of said grooves.

DONALD K. McRAE.

REFERENCES CITED

The following references are of record in the file of this patent:

UNITED STATES PATENTS

| Number | Name | Date |
|---|---|---|
| 452,278 | McIlvaine | May 12, 1891 |
| 580,949 | Murphy | Apr. 20, 1897 |
| 2,147,917 | Noren | Feb. 21, 1939 |
| 2,446,720 | Rominski | Aug. 10, 1948 |

FOREIGN PATENTS

| Number | Country | Date |
|---|---|---|
| 393,212 | Great Britain | June 1, 1933 |